(No Model.)
S. CONCANNON.
HAY STACKING MACHINE.
No. 472,338. Patented Apr. 5, 1892.
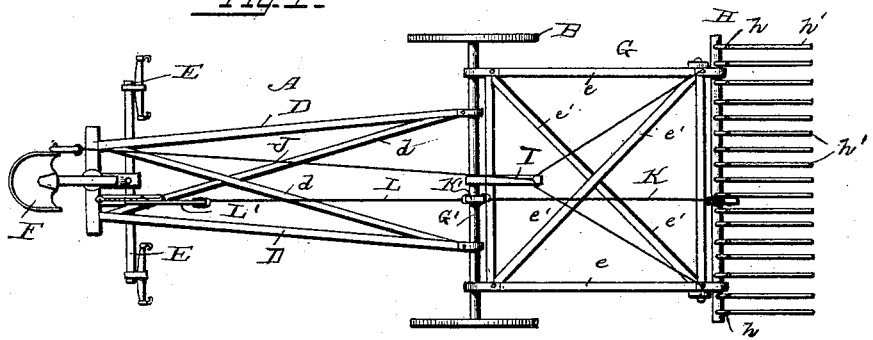
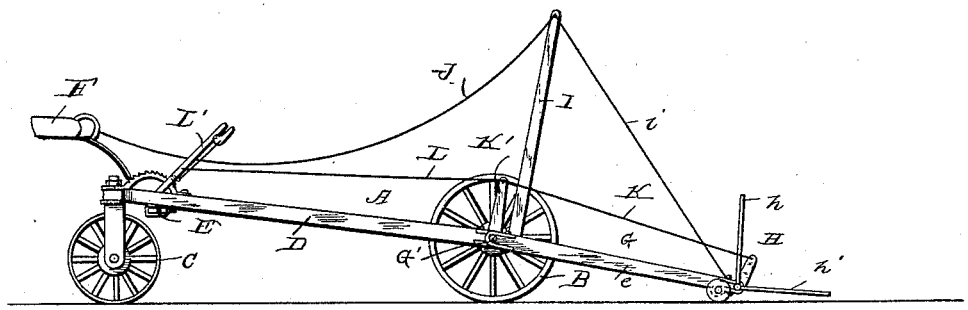
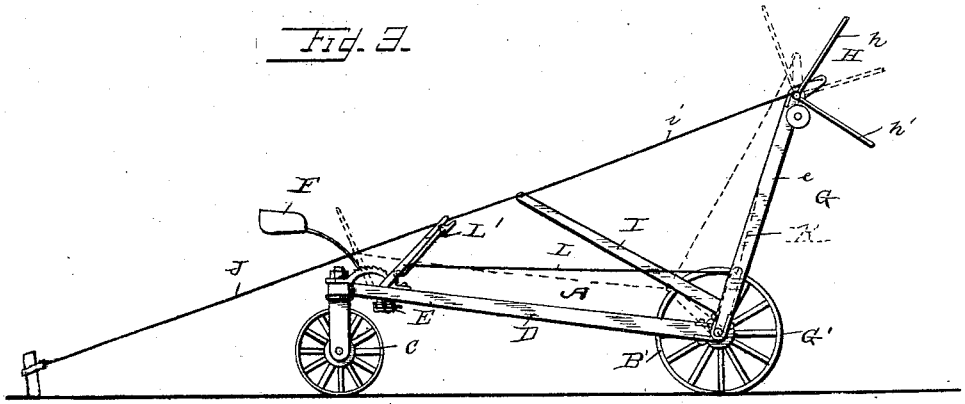
Witnesses
Jesse Heller
Philip C. Maar
Inventor
Sherman Concannon
by E. W. Anderson
his Attorney

UNITED STATES PATENT OFFICE.

SHERMAN CONCANNON, OF LENEXA, KANSAS.

HAY-STACKING MACHINE.

SPECIFICATION forming part of Letters Patent No. 472,338, dated April 5, 1892.

Application filed December 28, 1891. Serial No. 416,301. (No model.)

*To all whom it may concern:*

Be it known that I, SHERMAN CONCANNON, a citizen of the United States, and a resident of Lenexa, in the county of Johnson and State of Kansas, have invented certain new and useful Improvements in Hay-Stacking Machines; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a top plan view of the machine. Fig. 2 is a side elevation showing the rake-carrying frame in lowered position, and Fig. 3 is a similar view with the rake-carrying frame in raised position.

This invention has relation to certain new and useful improvements in combined hay raking and stacking machines; and it consists in the novel construction and combination of parts, as hereinafter specified.

In the accompanying drawings, the letter A designates the supporting-frame, comprising the main forward wheels B B, rear wheel C, which is preferably a caster-wheel, and connecting-bars D D, having the braces $d$ $d$. E is the draft attachment forward of the wheel C, and F the driver's seat, supported on the rear of the frame.

G designates the rake-carrying frame, comprising the parallel side bars $e$ $e$, having braces $e'$ $e'$, and having each a hinged connection at its rear end to the axle G'. On the ends of the bars $e$ $e$ is hinged the rake head H, which carries a double series $h$ and $h'$ of teeth, the two series being at right angles to each other.

I designates an arm or lever connected at its lower end to the rear cross-bar of the frame G and connected at its upper portion to the rear portion of said frame by means of rods $i$.

J is a rope or cable connected at one end to the upper portion of the lever I, by means of which said lever is operated.

K is a rod or link connected at one end to a short arm or lever on the rake-head and at the other end to an arm or lever K', pivotally secured to the central portion of the axle.

L is a second rod or link, the rear end of which is connected to a lever L' within reach of the driver's seat and at its forward end to the lever K'.

When the rake becomes loaded with hay, it is raised a short distance from the ground by means of the lever L', throwing the hay partially onto the vertical teeth. In this position it is driven until within a few feet of the stack, when a ring on the end of the cable J catches a peg or stake, which is usually driven in the ground a suitable distance from the stack. As the machine continues to approach the stack the tension on the cable J pulls the lever over backwardly and downwardly and elevates the rake and its load. By operating the lever L' to slack the cable the rake will trip its load onto the stack.

It is obvious that the construction of the supporting-frame as above described may be modified without departing from the spirit and scope of this invention.

Having described this invention, what I claim as new, and desire to secure by Letters Patent, is—

The hay rake and stacker comprising the supporting frame or vehicle, the rake-carrying frame G, having its side bars $e$ $e$ hinged to the axle of said vehicle, the rake-head hinged to the forward ends of said side bars and carrying two series of teeth at right angles to each other, the arm or lever I, secured at its lower end to the rear portion of the frame G and connected by rods $i$ with the forward end thereof, an arm or lever K', secured to the central portion of the axle, a rod or link connecting said arm and the rake-head, an operating-lever having a connection with said link, and an operating rope or cable connected to the lever I, substantially as specified.

In testimony whereof I affix my signature in presence of two witnesses.

SHERMAN CONCANNON.

Witnesses:
 H. L. SMITHERS,
 A. H. BARBER.